July 26, 1949.　　　F. C. HABERLAND　　　2,477,247

RELIEF VALVE

Filed July 8, 1943

Inventor:
Frederick C. Haberland
By: Edward C. Fitzhugh
Atty.

Patented July 26, 1949

2,477,247

UNITED STATES PATENT OFFICE 2,477,247

RELIEF VALVE

Frederick C. Haberland, Cleveland, Ohio, assignor, by mesne assignments, to Borg-Warner Corporation, Chicago, Ill., a corporation of Illinois Application July 8, 1943, Serial No. 493,878

1 Claim. (Cl. 137—53)

This invention relates to relief valves and particularly to that type of relief valve having means for preventing chattering or vibration of the valve while it is operating to relieve pressure in a fluid pressure system.

It has been proposed in prior devices of this character to utilize the pressure existing in the system to keep the valve closed, and to use an auxiliary relief valve to establish a reversal of pressure to open the valve when the unit pressure in the system exceeded a predetermined maximum. This resulted in some practical difficulties, one of which involved the rather high total pressure which was exerted upon the valve to keep it closed under normal conditions and which required the expenditure of a relatively large amount of power to effect a release, thus rendering the valve less sensitive than was desired. The excessive pressure resulted from the construction of the piston which was used to move the valve, one side of the piston usually including the valve body itself and the other being coextensive with the valve bore. The effective area of the side including the valve body was of course much smaller than the opposite side since the area represented by the valve body was totally ineffective.

The principal object of this invention is to provide a relief valve which utilizes fluid pressure to retain the valve closed under normal operating unit pressures, but which requires less power to open the same than relief valves heretofore available and hence is more efficient and sensitive.

A more specific object of this invention is to provide a relief valve for a hydraulic system wherein fluid pressure is utilized to keep the valve closed with an auxiliary relief valve for limiting the closing pressure, the opening of the auxiliary relief valve being initiated by the opening of the main relief valve.

Another specific object of this invention is to provide a relief valve for a hydraulic system which is hydraulically unbalanced in favor of its closed position for a predetermined range of pressures in the system and then gradually approaches a balanced state during a further range of pressures, a perfectly balanced state being reached at a predetermined maximum unit pressure in the system.

Another object of this invention is to provide a main relief valve for a hydraulic system and an auxiliary relief valve, said auxiliary relief valve being opened as a result of the opening of the main relief valve.

Another object of this invention is to provide a relief valve having a secondary or auxiliary releasing means, said auxiliary releasing means employing a reducing valve for controlling the operation of the main relief valve.

These and other objects of the invention will become clear from the following detailed description and from the accompanying drawings which form a part of the description and in which.

Figure 1:
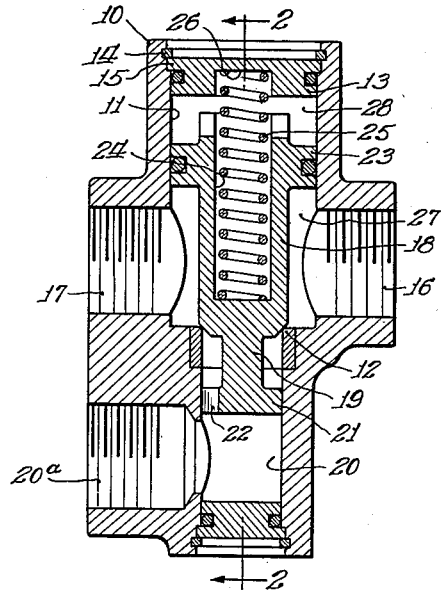
Fig. 1 is a section through a valve embodying this invention, this section showing the threaded openings for connection to the pressure and return lines.

Referring now to Fig. 1 for a detailed description of the invention, the valve is comprised of a housing 10 having a valve bore 11 which is defined in part by a valve seat 12 at one end and by an end closure plate 13 at the other end, said plate 13 being retained in housing 10 by means of a snap ring 14 acting against a flange 15 in the plate. Valve bore 11 is in direct communication with an opening 16 which is threaded for connection with a pipe forming part of the hydraulic system (not shown) which is to be controlled by the valve. If the valve is to be inserted in series in the system a second opening 17 is provided, the opening being threaded for connection to a pipe forming a continuation of the one to be threaded into opening 16.

Within valve bore 11 is a spill or relief valve assembly having a body 18 of greater diameter than that of valve seat 12, engaged by a spill or relief valve face. A short reduced stem 19 extends through seat 12 and into low pressure exhaust opening 20 which in turn opens into a return outlet 20a. The end of valve stem 19 is enlarged to form a guide 21 which engages the walls of exhaust opening 20 and keeps the valve centered with respect to valve seat 12. Said guide 21 has one or more openings 22 therethrough to permit the fluid to pass from the region adjacent valve seat 12 to the port of exhaust opening 20 leading into return outlet 20a.

The upper portion of spill or relief valve body 18 is provided with a motive piston 23 which, as shown in Fig. 1, is formed as an integral part of valve assembly. Said body 18 has a central bore 24 passing through the greater portion thereof and serving to retain a spring 25 which is compressed between the inner terminal of bore 24 and end closure plate 13. A recess 26 is provided in end plate 13 opposite bore 24 to receive the upper end of spring 25. It may be stated here that spring 25 is not sufficiently strong to keep spill or relief valve 18 closed under ordinary working pressures. It will be observed that the pressure in the system will be transmitted to the underside (Fig. 1) of motive piston 23, and hence will oppose the action of spring 25. It will also be observed that motive piston 23 divides valve bore 11 into two chambers, including spill valve chamber 27 always in direct communication with the pressures existing in the system and upper chamber 28 comprising that portion included between motive piston 23 and plate 13. It is contemplated that spill or relief valve 18 will be moved or controlled by the difference in pressure existing between the upper surface of piston 23 and that on the lower surface adjacent valve 18. The manner in which these controlling differences in pressure are obtained will now be described.

Figure 2:
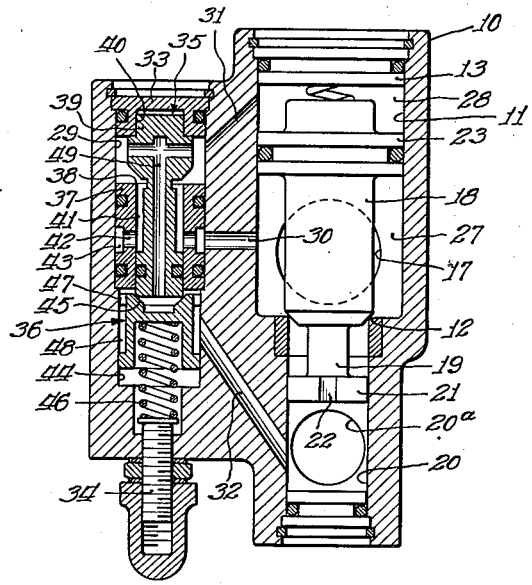
Fig. 2 is a section through the valve shown in Fig. 1, the section being taken along lines 2—2 of Fig. 1 and showing the main valve in its closed position.

Referring to Fig. 2, housing 10 has another bore 29 of small cross-section disposed substantially parallel to bore 11, with a conduit 30 connecting portion 27 with bore 29 and a conduit 31 connecting said bore 29 with portion 28. A third conduit 32 connects a reduced section 44 of bore 29 with exhaust opening 20. Said bore 29 is closed at its upper end by an end closure plate 33, the opposite end being closed by housing 10 except for the portion closed by an adjusting screw 34.

Within bore 29 are two control valves including a first, upper control valve designated generally at 35 and a second lower control valve designated generally at 36. Valve 35 seats on a liner 37 at 38 guided in its movement by a head 39 which fits with a relatively loose guiding fit into a corresponding recess 40 in plate 33. It is contemplated that the reciprocating movement of head 39 in recess 40 will provide a dash pot action for valve 35, the fluid in valve bore 29 flowing into and out of recess 40 around head 39. When a state of equilibrium exists, or when movement of valve 35 is slow, the fluid in recess 40 will be at the same unit pressure as the fluid in section 28. The central portion of valve 35 is of reduced diameter so as to form a passageway 41, said passageway communicating with the upper portion (Fig. 2) of bore 29 when valve 35 is open and thence to conduit 31 leading to chamber 27. A series of apertures 42 in liner 37 connect passageway 41 with a groove 43 which is aligned with conduit 30 leading to chamber 27.

The second lower control valve 36 operates in the reduced section 44 of bore 29, the shoulder formed by the juncture of the two sections being used as an abutment to prevent liner 37 from moving downward from the position shown. Said valve 36 is provided with a seat 45 against which the lower end (Fig. 2) of the first control valve 35 seats. Valve seat 45 has a slightly smaller effective area than valve seat 38. A spring 46 is compressed between adjusting screw 34 and lower control valve 36 so as to urge control valve 36 toward control valve 35. The movement of both control valves in an upward direction is limited by the action of plate 33 against the shoulder formed in the upper portion of valve 35 by head 39. Near the upper limit of its movement valve 36 is spaced from liner 37 and this space is connected by means of axial slots 47 in valve 36 to a section of reduced diameter 48 in communication with conduit 32. A drilled passageway 49 connects the top of valve 36 with the upper portion of bore 29 and conduit 31 leading to upper chamber 28. Thus the upper portion of valve 36 is always subject to the pressure in chamber 28. This pressure will of course tend to balance some of the downward pressure exerted by control valve 35 but since all parts of head 39 are balanced, and since valve seat 45 is slightly smaller than valve seat 38, there will be a net total pressure in a direction to keep valve 35 closed.

The operation of the relief valve is as follows:
The fluid in the system normally flows into spill or relief valve chamber 27 and around spill or relief valve body 18. Said valve body 18 is initially held down by the relatively weak spring 25, and the valve face remains closed under ordinary working pressures. The fluid in spill valve chamber 27 also flows through conduit 30, groove 43 and openings 42 into passageway 41 and thence past valve seat 38 into conduit 31 and upper chamber 28. First control valve 35 is normally held open by spring 46 which constantly applies pressure to second control valve 36 and through valve seat 45 to the lower portion of first control valve 35. As pressure is built up in chambers 27 and 28, opposing forces are exerted upon motive piston 23. It will be noted that the effective piston area in upper chamber 28 is substantially the same as the area of the bore 11 whereas the effective piston area in spill valve chamber 27 is the area of motive piston 23 minus the area of valve seat 12 where it contacts the valve face. Due to the greater effective area of motive piston 23 in upper chamber 28 a greater total pressure is exerted toward seating or closing valve proper 18. Valve 18 thus will be closed under all normal operating conditions, and will be maintained in a closed position by the pressure developed in the fluid itself. The unit pressure in upper chamber 28, however, is not always the same as the unit pressure in spill valve chamber 27 since the pressure in chamber 28 is controlled by first control valve 35 and this valve is a pressure reducing valve, the reduced pressure being controlled by spring 46.

Figure 3:
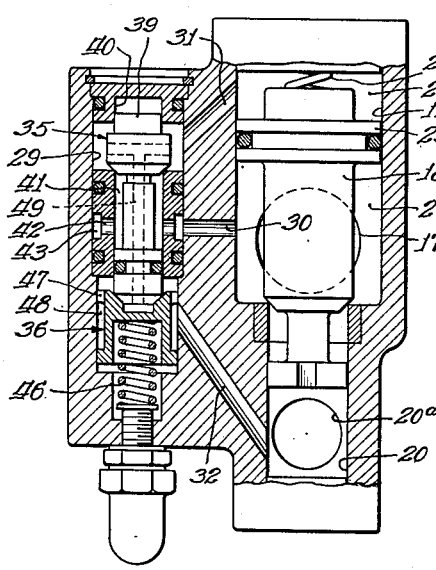
Fig. 3 is a section similar to that of Fig. 2 showing the auxiliary relief valve in its closed position.
Figure 4:
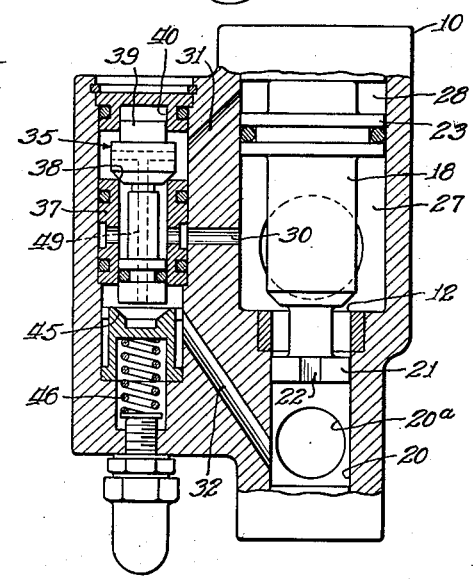
Fig. 4 is a section similar to that of Fig. 2 showing both the main valve and the auxiliary relief valve open.

Let it be assumed for purposes of illustration that the valve 18 is set to relieve or spill at 1000 pounds per square inch and that pressure reducing, control valve 35 is adapted through spring 46 to reduce this pressure to approximately 700 pounds per square inch delivered to upper chamber 28. As long as the pressure in spill or relief valve chamber 27 is less than 700 pounds per square inch direct communication will be had between chambers 27 and 28 through first control valve 35 so that the unit pressure in each chamber will be the same. However, should pressure in chamber 27 exceed 700 pounds per square inch, pressure reducing control valve 35 will close as shown in Fig. 3 due to the excess pressure in contact with the upper surface of piston 39 of valve 35 acting against valve 36 and its supporting spring 46, the fluid still being in communication with the upper end of valve 36 through passageway 49 from valve seat 38. With valve 35 closed, the pressure in chamber 28 cannot increase and hence any increase in pressure in chamber 27 tends to strike a balance between the force developed in chamber 28 to keep the valve closed and the force tending to lift the valve 18 off its seat to relieve the pressure in the system. It is contemplated that balance will be struck when the maximum permissible pressure of 1000 pounds per square inch is reached. Any pressure exceeding 1000 pounds per square inch will overbalance the forces and move motive piston 23 and its associated valve 18 upward, thereby relieving pressure in the system. In moving upward, however, piston 23 will temporarily increase the pressure in chamber 28 and all passages communicating therewith and this increased pressure will be transmitted through passageway 49 in valve 35 to the top of valve 36. Valve 35 is already seated on seat 38 in liner 37 and the liner cannot move downward because of the shoulder formed by the juncture of the two sections of valve bore 29. The excessive pressure, therefore, will separate valve 36 from the lower portion of valve 35 and permit the fluid to escape through axial slot 47, around the reduced portion 48 of valve 36 into conduit 32 and then into the low pressure exhaust or return line 20. The compressed spring 46 is constantly effective against valves 35 and 36 and hence the pressure in chamber 28 will always remain at 700 pounds per square inch. Should the upward movement of motive piston 23 and its associated valve cease, valve 36 will close. After the main spill or relief valve 18 has opened in response to excessive pressure and the pressure in the system drops below 1000 pounds per square inch there is available a pressure of 700 pounds per square inch in section 28 to close the valve, it being remembered that a pressure greater than 1000 pounds per square inch is required to overbalance the pressure of 700 pounds per square inch in chamber 28 and that pressure reducing control valve 35 functions to maintain at least a 700 pounds per square inch pressure in that section.

As valve 18 moves downward to its closed position, however, pressure in chamber 28 drops below 700 pounds per square inch and control valve 35 is then opened by spring 46 which first closes valve 36 and then opens valve 35 to permit fluid to pass into section 28 until the requisite pressure of 700 pounds per square inch is again reached in that section.

Vibration or flutter of the valve 35 is prevented by the dash-pot action previously mentioned in connection with the description of head 38 and recess 40.

It will be apparent that the relief valve construction just described will provide a very positive action for valve 18 and that due to the fact that the valve itself operates the piston 23 against a hydraulic head, which in turn is controlled by a valve having a dash-pot connected therewith, the main valve 18 will thus be free of chatter or vibration. It will also be apparent that at the critical unit pressure, valve assembly 18 is balanced and that a very small increase in pressure will force the valve open, thus rendering the valve more sensitive and accurate.

The foregoing description is illustrative of a preferred embodiment of this invention and it is understood that the scope of this invention is not limited to the particular sizes, shapes and locations of valves, conduits, springs, etc., but is to be determined by the appended claim.

I claim:

A relief valve assembly comprising a housing; a main valve bore in said housing; a valve seat in said bore; an outlet opening communicating with said valve seat; a valve body in said bore cooperating with said seat; a piston integral with the valve body and dividing the bore into a first chamber and a second chamber; an inlet opening communicating with said first chamber; an auxiliary valve bore adjacent said main valve bore; conduits from the outlet opening and from the two chambers of the main valve bore leading into the auxiliary valve bore; and valve means in said auxiliary bore responsive to the pressure in said first chamber and provided with means for connecting the second chamber with the first chamber conduit to increase the unit pressure in the second chamber to that of the first chamber, and then cut the second chamber off from the first chamber to maintain said unit pressure in said second chamber, said valve means being responsive to an increase in the pressure in said second chamber resulting upon opening of said main valve body to connect said second chamber to the outlet opening to exhaust the unit pressure in said second chamber, said last mentioned valve means comprising a liner the inside of which is in constant communication with the first chamber conduit; a spool valve passing through said liner; one end of the spool having a fluid tight seal with the interior of the liner and the other end having a shoulder thereon adapted to rest on said liner and cut off the second chamber from the first chamber; a recess in the housing adapted to receive the said other end of the spool to form a dash-pot; an abutment on the said other end of the spool for limiting movement thereof into said dash-pot; a movable valve seat cooperating with said one end of the spool; a passageway through said spool and connecting at all times the last mentioned valve seat with the second chamber; and spring means for urging the last mentioned valve seat against said spool and the shoulder of said spool off said liner.

FREDERICK C. HABERLAND.

REFERENCES CITED

The following references are of record in the file of this patent:

UNITED STATES PATENTS

| Number | Name | Date |
|---|---|---|
| 611,496 | Lize | Sept. 27, 1898 |
| 2,225,916 | Maglott | Dec. 24, 1940 |
| 2,249,206 | Hubbard | July 15, 1941 |
| 2,279,571 | Kane | Apr. 14, 1942 |
| 2,375,610 | Gondek | May 8, 1945 |

FOREIGN PATENTS

| Number | Country | Date |
|---|---|---|
| 297,378 | Great Britain | June 23, 1927 |